(12) United States Patent
Guggisberg

(10) Patent No.: US 7,243,152 B2
(45) Date of Patent: Jul. 10, 2007

(54) METHOD FOR TRANSMITTING SHORT MESSAGES OVER THE INTERNET

(75) Inventor: Karl Guggisberg, Comano (CH)

(73) Assignee: Universal Communication Platform AG, Vienna (AT)

( * ) Notice: Subject to any disclaimer, the term of this patent is extended or adjusted under 35 U.S.C. 154(b) by 773 days.

(21) Appl. No.: 10/399,505

(22) PCT Filed: Oct. 19, 2001

(86) PCT No.: PCT/AT01/00339

§ 371 (c)(1),
(2), (4) Date: Aug. 8, 2003

(87) PCT Pub. No.: WO02/33985

PCT Pub. Date: Apr. 25, 2002

(65) Prior Publication Data

US 2004/0029598 A1 Feb. 12, 2004

(30) Foreign Application Priority Data

Oct. 20, 2000 (AT) ............................. A 1809/2000

(51) Int. Cl.
*G06F 13/00* (2006.01)

(52) U.S. Cl. ................. 709/227; 709/206; 709/237

(58) Field of Classification Search ............... 709/206, 709/219, 227; 719/313; 455/466
See application file for complete search history.

(56) References Cited

U.S. PATENT DOCUMENTS 5,768,509 A 6/1998 Gunluk .................. 395/200.33

(Continued)

FOREIGN PATENT DOCUMENTS

| EP | 0 777 394 | 6/1997 |
|---|---|---|
| EP | 0 954 146 | 11/1999 |
| WO | WO 99/20062 | 4/1999 |
| WO | WO 99/41885 | 8/1999 |
| WO | WO 00/36854 | 6/2000 |

OTHER PUBLICATIONS

Borenstein, N. et al, "MIME (Multipurpose Internet Mail Extensions) Part One: Mechanisms for Specifying and Describing the Format of Internet Message Bodies," RFC 1521, Bellcore, Innosoft, Sep. 1993.

*Primary Examiner*—Viet D. Vu
(74) *Attorney, Agent, or Firm*—Zilka-Kotab, PC

(57) ABSTRACT

To provide a method for transmitting short messages (SMS) between computers (3, 8, 9) in the Internet (4), wherein the short message (SMS) is converted into a data format comprised of a header part (10) and a useful part (32), with at least one data field (11) for determining the data format, at least one data field (16) for identifying the sender, and at least one data field (19) for identifying the recipient being inserted into the header part (10), it is provided that before, during and, optionally, after the transmission of the short message (SMS), character strings (.LOGIN, .SELECT-CHANNEL) are exchanged between computers (3, 8, 9). By using the data format described in combination with the character strings which are exchanged between the computers (3, 8, 9), a protocol (ISMTP, Internet Short Message Transfer Protocol) that is suitable for such a data transfer and variable can be created which is based on a computer network, e.g. a TCP-IP-based network. By using this data format, a protocol suitable for such a data transmission (ISMTP Internet Short Message Transfer Protocol) can be created which is based on a computer network, e.g. a TCP-IP based network.

24 Claims, 4 Drawing Sheets

U.S. PATENT DOCUMENTS

| | | | |
|---|---|---|---|
| 5,878,397 A | 3/1999 | Stille et al. | 704/466 |
| 5,915,222 A | 6/1999 | Olsson et al. | 455/466 |
| 5,946,629 A | 8/1999 | Sawyer et al. | 455/466 |
| 6,067,529 A | 5/2000 | Ray et al. | 705/26 |
| 6,078,820 A | 6/2000 | Wells et al. | 455/466 |
| 6,125,281 A | 9/2000 | Wells et al. | 455/466 |
| 6,230,002 B1 * | 5/2001 | Floden et al. | 455/411 |
| 6,400,958 B1 * | 6/2002 | Isomursu et al. | 455/466 |
| 6,771,949 B1 * | 8/2004 | Corliss | 455/413 |
| 6,891,811 B1 * | 5/2005 | Smith et al. | 370/310 |

* cited by examiner

METHOD FOR TRANSMITTING SHORT MESSAGES OVER THE INTERNET

FIELD OF THE INVENTION

The present invention relates to a method for transmitting short messages between computers in the Internet, wherein the short message is converted into a data format comprised of a header part and a useful part, with at least one data field for determining the data format, at least one date field for identifying the sender, and at least one data field for identifying the recipient being inserted in the header part.

Even though the present method relates to the Internet, also comparable data networks may serve as a medium for transmitting short messages.

BACKGROUND OF THE INVENTION

To transmit short communications, in particular so-called short messages, a data service has been created in GSM (Global System for Mobile Communication)—based mobile telephone networks, which has become known under the abbreviation SMS (Short Message System). This data service has the function of transmitting short messages limited to 160 alphanumeric characters between mobile phones (cell phones) or terminals in a quick and inexpensive manner. Besides the sending of texts it is also possible to send images or sounds by SMS Accordingly, it is differentiated between textual and binary short messages. Longer documents for the transmission of which 160 characters are not sufficient can be sent via so-called segmented short messages, i.e. individual short messages which can be interlinked. The limiting to 160 characters per SMS is dictated by the technology of the terminals, e.g. mobile phones.

To transmit short messages between mobile phones, the desired short message is entered via the keyboard of a mobile phone and sent. When the message has arrived at the Short Message Service Center (SMSC) of the respective mobile phone network provider, it is stored there. The Short Message Service Center (SMSC) then tries to forward the short message to the recipient by sending a sending information, the so-called Send Routing Information (SRI), to a register containing information regarding the addresses of the participants, the so-called Home Location Register (HLR). By way of the recipient number, the recipient can be localized in the HLR. The HLR replies to the Short Message Service Center (SMSC) with an information, and the Short Message Service Center (SMSC) sends this information together with the short message to the respective switching unit, the so-called Mobile Switching Center (MSC) which searches for the participant or for the respective base station in the cell in which the participant is at present and sends the short message to this base station. Transmission within the mobile phone network commonly occurs according to the so-called SS7(Signaling System No. 7)-protocol.

Such a transmission of short messages within a telecommunication network is disclosed, e.g., in U.S. Pat. No. 5,915,222 A. Also U.S. Pat. No. 5,768,509 A describes a short message service for mobile telecommunication networks. From WO 98/02005 A1, a method for transmitting short messages in a digital telecommunication system is known which can do without any special SMS-interfaces and thus also ensures a simple an inexpensive set-up.

Moreover, it is common to transmit short messages from data networks, such as, e.g., the Internet, to mobile terminals. In this instance, the short message will be entered via the keyboard of a computer, and transmitted via the data network, e.g. the Internet, to a corresponding converter, a so-called gateway. From the gateway, the short message will be forwarded via a certain protocol to the Short Message Service Center (SMSC) of the respective telecommunication network. For the exchange of the short messages between the data network and the telecommunication network, usually one of the three following protocols will be used:

1) Short Message Peer-to-Peer Protocol (SMPP)
2) Universal Communication Protocol (UCP)
3) Computer Interface for Message Distribution (CIMD).

All these known protocols are suitable for connecting one user server with the Short Message Service Center of a telecommunication network. However, service providers of data networks, e.g., the Internet, which operate the links to the Short Message Service Centers of more than one telecommunication network provider, are faced with problems: thus, the service providers must support all protocols, since depending on the telecommunication network provider, different protocols can be used. Furthermore, there is no uniform format for the short messages which could be used for administering, storing and transmitting the latter via data networks externally of the telecommunciation networks. As a remedy, the service providers must develop and implement internal short message formats which differ from the data formats according to the above-mentioned three protocols.

To transmit short messages from mobile terminals to data networks, a data line between the Short Message Service Center of the telecommunication network provider and the respective data network is necessary. This, however, confronts the service provider of the data network with enormous costs for renting appropriate, often international, data connections.

WO 00/36854 A1 discloses a method for transmitting short messages to analog terminals, with a corresponding conversion of the digital contents of the short message into analog signals, e.g. into sound signals. In this manner, the transmission of short messages from mobile phones to analog fax machines, e.g., is enabled.

U.S. Pat. No. 6,078,820 A as well as U.S. Pat. No. 6,125,281 A describe further methods of transmitting news in telecommunication systems, requiring, however, a direct connection between the Short Message Service Center of the mobile phone network provider and the respective server of the data network, e.g. the Internet, via a fixed line.

WO 99/20062 A1 describes a method for transmitting SMS-messages between a short message site and mobile terminals, wherein the short message is converted into a data format comprised of a header part and a useful part, with different data fields, among them also a data field for identifying the sender, being provided in the header part.

EP 0 777 394 A1, U.S. Pat. No. 6,067,529 A and WO 97/20442 A1 describe methods for transmitting SMS messages via the Internet, wherein, e.g., an e-mail is converted into an SMS-message and transmitted to a mobile recipient within a mobile telephone network, or an SMS is converted into a fax or an e-mail.

Finally, EP 0 954 146 A2 shows a method for transmittiiw data via the Internet to a mobile terminal, with conventional data formats, so-called PDUs (Protocol Data Units) being used.

BRIEF SUMMARY OF THE INVENTION

The invention has as its object to provide a method for transmitting short messages via the Internet, which is particularly efficient and variable, wherein a generally valid data format is to be used. Moreover, the data format shall be expandable for additional characteristics of short messages and new characteristics to come. The disadvantages of the known methods are to be avoided or at least reduced so that the sending of short messages via data networks, such as the Internet, will he possible in an efficient and cost-effective manner.

The object of the invention is achieved in that before, during, and optionally after, the transmission of the short message, character strings are exchanged between computers. By exchanging such character strings together with the short message that is transmitted in a generally valid data format, a universal protocol for transmitting short messages between computers of the Internet is created. The data format which is comprised of a header part and the useful part, wherein the header part comprises at least one data field for defining the data format, at least one data field for identifying the sender, and at least one data field for identifying the recipient, constitutes a generalized data format which combines in one set of data all the parameters necessary for describing the short messages. Thus, it is possible to transmit all types of short messages, i.e. binary, textual and segmented short messages, according to the present method. The data format is constructed similar to the e-mail formats in the Internet and differs substantially from the usual data formats, the so-called PDUs (Protocol Data Units) in the three existing protocols SMPP, UCP and CIMD. The useful part of the data format contains the information proper of the short message to be transmitted. By the defining header part in combination with the corresponding useful message it is possible to transmit the short message via the Internet independently of the protocol used between the Short Message Service Centers of the telecommunication networks and the data network. In the data format, short messages having more than 160 characters can be transmitted without having to segment short messages and re-connect them again upon transmission, as customary. In the present instance, messages exceeding 160 characters are transmitted merely separated by line breaks.

Moreover, the data format used can be expanded nearly to an unlimited extent to further fields of data for future characteristics of short messages. By the data format in combination with the exchange of character strings between computers it is possible to transmit short messages in an efficient and low-cost manner by using available data networks, such as, e.g., the Internet. The present invention therefore makes it possible to transmit short messages between both mobile and stationary terminals in a very suitable manner. In case of a communication within one data network, the short messages will be transmitted according to the protocol described. In case of a communication between the Internet and different telecommunication networks, a conversion of the protocol between the commonly used protocols and a protocol based on the inventive data format will be required. Such a conversion will be carried out in the so-called gateways, preferably by software. Therefore, according to the present invention, a protocol is created for transmitting short messages via computer networks in which so-called connection-oriented sessions are possible from one end point to another end point. So-called TCP/IP (Transmission Control Protocol/Internet Protocol)-based networks are an example thereof. In contrast to the method according to the invention, existing protocols have only been designed for transmitting short messages from an external short message unit to a Short Message Service Center of a mobile phone provider. By exchanging character strings between the computers in the Internet, moreover, further functionalities can be achieved. For instance, prior to transmitting a short message from the sender, a character string can be transmitted to a computer in the Internet, which orders the computer to transmit the short message to a certain Short Message Service Center in a certain mobile telephone network. By this, also a differentiation is possible as to whether the short message is to be transmitted to a mobile recipient, e.g. a mobile phone, or to a computer in the Internet. The described method not only provides for a possible way of transmitting and administering short messages in the Internet, but it also guarantees additionally a very high compatibility to the mobile telephone network. By this, a conversion to the common interface protocols between mobile telephone network and Internet, such as, e.g., SMPP or UCP, is clearly defined. In contrast to the method according to the invention, the known protocols contain only parameters which are tailored to the mobile telephone network and thus would not be suitable as a protocol for a data network or for the Internet. The method according to the invention may itself constitute an interface protocol between the mobile telephone network and data network and can also be used as a direct connecting protocol to the mobile telephone network. Thus, two functionalities, i.e. protocol for the data network and protocol for the interface to mobile telephone networks, are realized, and by the present invention the increasing integration between data- and telecommunication networks is promoted.

Advantageously, at least one character string is exchanged between the computers of the internet for a channel selection, already before the transmission of the short message. By this measure it is possible to order the computer of the Internet involved in the transmission of the short message even before receipt of the message what has to be done with the message, e.g. where the message is to be transmitted to. In known transmission methods of short messages, such information has been enclosed e.g. in the data format of the message so that only upon receipt of the entire message and extraction of the respective information it could be decided what should happen with the message. By the method according to the invention, no additional method steps are necessary which would extract the respective information from the short message.

Moreover, it is advantageous if at least one character string for authenticating the sender of the short message were exchanged between the computers of the Internet prior to transmission of the short message, and that this character string contained at least one user identification.

Preferably, the so-called MIME version (Multipurpose Internet Mail Extensions) is entered in the data field to determine the data format. This is an Internet standard for indicating types of files for the communication in the Internet. The value for the MIME type presently is fixed at "1".

Further parameters which are associated to a short message can be set via additional data fields.

According to a further characteristic of the present invention it is provided for a data field to be inserted in the header part so as to define the type of short message. The so-called MIME type serves to distinguish between different transported contents (Media Objects). Accordingly, this field should be used to differentiate between purely textual, binary or segmented short messages. In case of a transmission of text messages, the useful information of the short message will be stored as normal text in the ISO format. Binary short messages are transmitted as a sequence of hexadecimal-encoded characters.

In the header part, also a data field for indicating a unique identification for the short message can be inserted.

Furthermore, a data field for indicating the type of network of the sender of the short message may be inserted in the header part.

Moreover, a data field for determining the numbering plan of the network of the sender can be inserted.

Optionally, furthermore, a data field for determining the type of network of the recipient and a data field for defining the numbering plan of the network of the recipient can be inserted.

An identification for the contents transported with the short message may also be advantageous for various applications. Accordingly, this identification can be inserted in a field in the header part of the data format.

A further field in the data format can be provided so as to identify whether or not the useful data in the short message are compressed.

A further data field may be provided to distinguish the class of the short message according to the GSM standard 03.38.

To define the encoding of the useful data of the short message, a further field in the data format may be reserved. For instance, it may be differentiated between a normal alphabet, 8-bit data, the so-called UCS2-coding and others.

To define the priority of the short messages, a rating ranging, e.g., from 0 to 9, may be inserted in a further data field in the header part.

If a further data field in the header part is inserted for inputting the expiration date of the short message, the short message may automatically be deleted if this expiration date is exceeded, and be no longer transmitted.

A further data field may serve to indicate whether or not a confirmation is required after the short message has successfully been delivered to the recipient.

A further data field may be reserved to indicate whether or not a previously delivered short message is to be replaced by the present short message. In this manner, redundant or outdated short messages can automatically be replaced by more recent short messages.

A further data field may serve to define whether or not transmission of the short message is to be repeated.

A further option in the data format provides for the possibility of entering a date at which the short message is to be forwarded.

A data field for entering the date on which the short message has been created may also be advantageous.

A further data field may be provided for transmitting the Internet addresses (IP number addresses) of the computers involved in the transmission. In this manner, security checks may be effected when receiving and transmitting the short messages.

According to the present method, the sending computer at first logs in at the receiving computer by a character string that contains a user identification and a password, whereupon the receiving computer answers to the sending computer with a character string which contains a status code and a status report from which it can be taken whether or not the log-in has been successful. Subsequently, the sending computer selects an output channel at the receiving computer, and for this it sends a character string together with the name of the output channel to the receiving computer. The receiving computer answers with a character string which contains a status code and a status report from which it appears whether or not the selection of the output channel has been successful. Finally, the sending computer transmits a short message to the receiving computer. The sending computer may terminate an on-going session at any time by transmitting a quitting character string to the receiving computer. In such a case the receiving computer ideally will answer with a character string containing a status code and a status report which indicates whether or not the operation has been successful.

The invention will now be explained in more detail by way of exemplary embodiments and with reference to the accompanying drawings.

BRIEF DESCRIPTION OF THE SEVERAL VIEWS OF THE DRAWINGS

Therein.

DETAILED DESCRIPTION OF THE INVENTION

Figure 1:
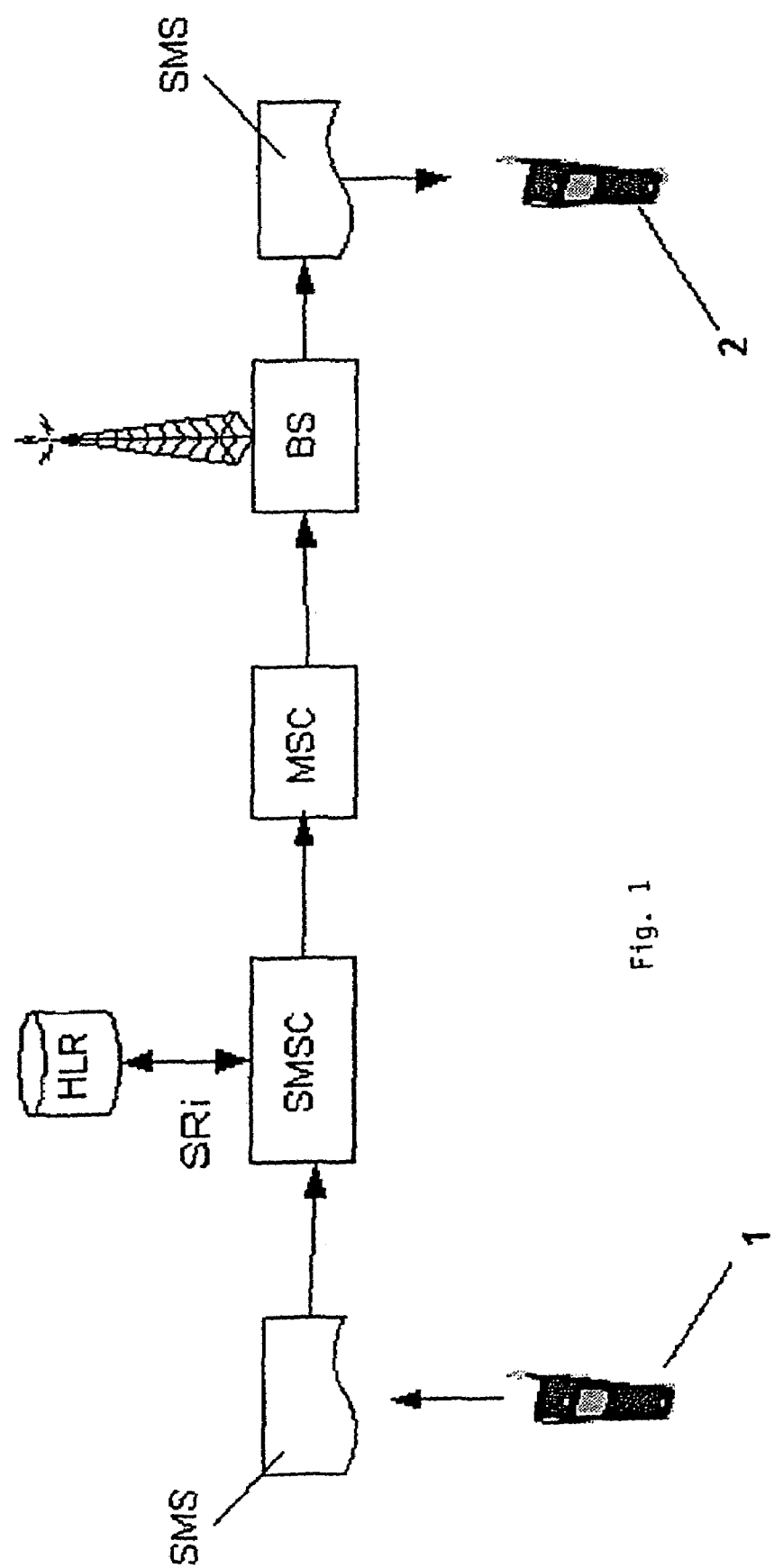
FIG. 1 is a schematic block diagram to illustrate the transmission of short messages between mobile phones.

According to FIG. 1, from a mobile phone 1 a short message SMS is produced and transmitted to a Short Message Service Center SMSC of the mobile network provider. The Short Message Service Center SMSC sends a so-called Send Routing Information SRI to the Home Location Register HRL, which localizes the recipient by way of the recipient number and responds with an appropriate information to the Short Message Service Center SMSC. In combination with the information received from the Home Location Register HRL and the short message SMS. the Short Message Service Center SMSC will send the respective data to an associated switching unit, the corresponding Mobile Switching Center MSC. Finally, the MSC will send the short message SMS to a respective Base Station BS, i e. the one which belongs to the cell in which the participant is just then, and it will transmit the short message SMS to the mobile phone 2 of the recipient.

Figure 2:
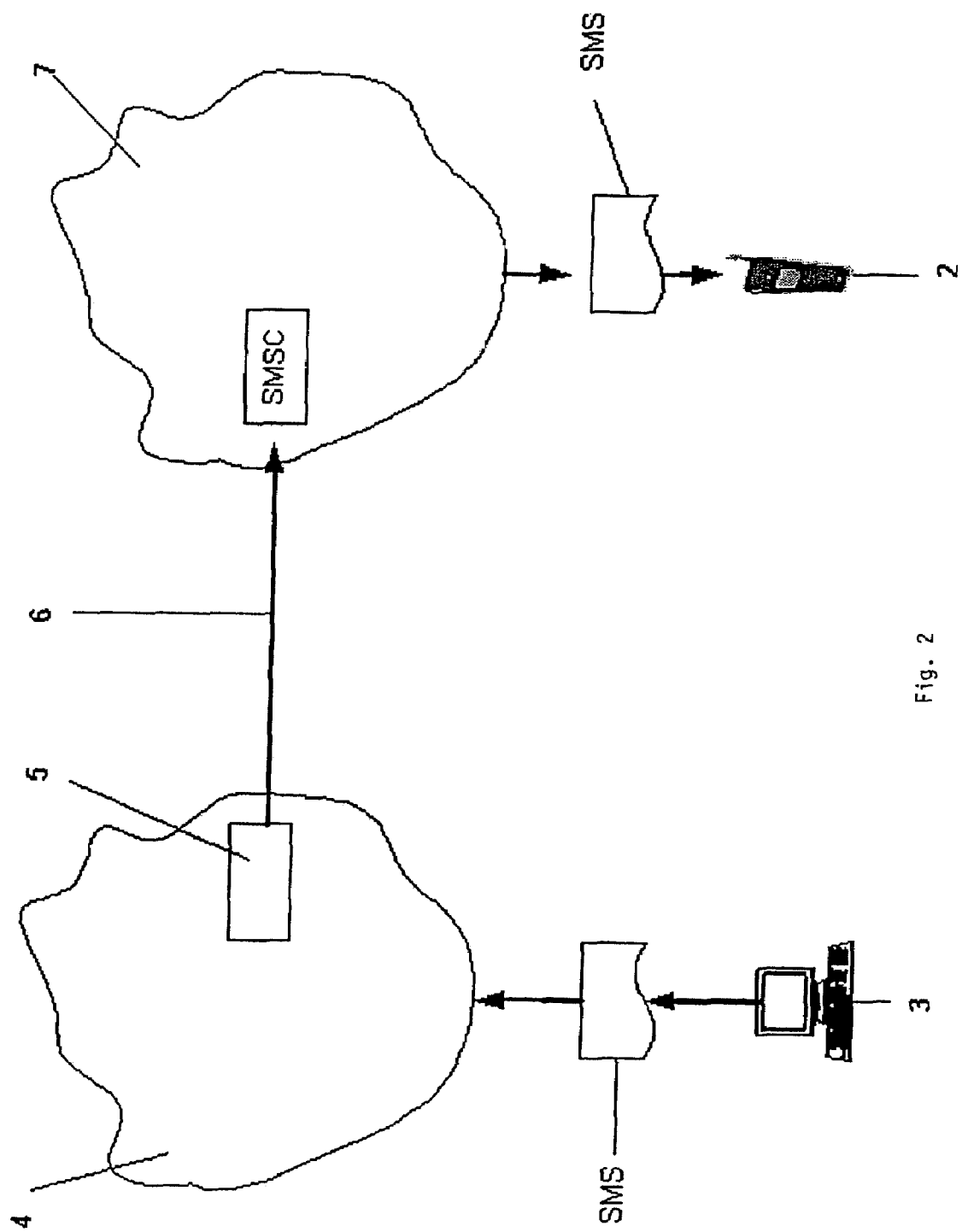
FIG. 2 is a schematic block diagram to illustrate the transmission of short messages from a stationary terminal, such as, e.g., a computer, to a mobile phone.

FIG. 2 illustrates the situation where a short message SMS is transmitted from a stationary terminal, e.g. a computer 3, using a data network 4, e.g. Internet, to a mobile terminal, e.g. a mobile phone 2 of a recipient. For this purpose, the short message SMS is input via the keyboard of the computer 3, and via the data network 4, e.g. Internet, it is forwarded to a respective gateway 5 where the conversion of the short message SMS into one of the conventional protocols is effected. Via a data line 6 the short message SMS is further transmitted from the data network 4 into the Short Message Service Center SMSC of the telecommunication network 7. Within the telecommunication network 7, the short message SMS is forwarded to the mobile phone 2 of the recipient according to the mode of procedure indicated with FIG. 1. According to the prior art, a data line 6 designed as a fixed line frequently is required between the data network 4 and the telecommunication network 7, which data line 6 causes high costs that must be conferred upon the sender and/or to the recipient of the short messages.

Figure 3:
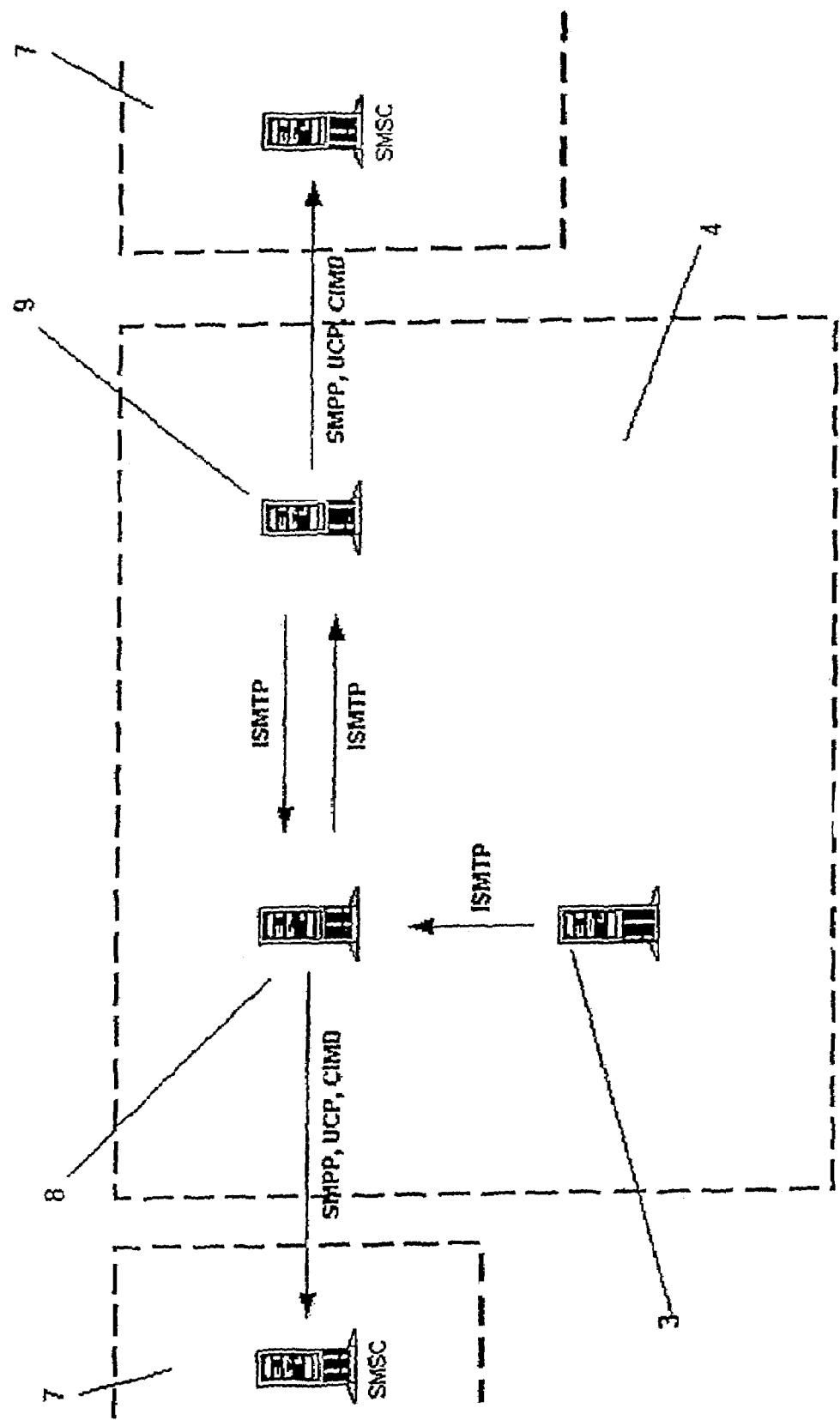
FIG. 3 schematically shows the network architecture for transmitting short messages via the Internet according to the present invention.

FIG. 3 shows a network architecture for transmitting short messages via a data network, in particular via the Internet 4, according to the present invention. Within the Internet 4, a computer 3 is arranged via which a short message SMS can be transmitted to another computer 8. The communication between the computers 3 and 8 is effected via the ISMTP protocol (Internet Short Message Transfer Protocol) described. If the short messages SMS are to be transmitted to a telecommunication network 7, a conversion of the ISMTP protocol to one of the commonly used protocols is required for a communication between the data network 4 and the telecommunication network 7, which will be carried out by computer 8 or by a gateway 9. In one of the protocols described, the Short Message Peer-to-Peer Protocol (SMPP), the Universal Communication Protocol (UCP) or the Computer Interface for Message Distribution (CIMD), the short message SMS reaches a Short Message Service Center SMSC of a telecommunication network 7, and from there it is forwarded in a manner known per se to the mobile phone of a recipient (not illustrated in FIG. 3). In Internet 4, it is differentiated between three different types of nodes: the computer 3 which is a computer for generating and transmitting short messages SMS; the computer 8 which is adapted to receive short messages that are sent via the computer 3 or of short messages which originate from a gateway 9, and which further transmits the respective short messages to other computers 8; and finally, the gateways 9 as the third type of nodes within the Internet 4, which gateways are capable of receiving short messages from a sender via the computer 3 or a computer 8 provided in the Internet 4, and forward them to a Short Message Service Center SMSC of a telecommunication network 7.

The functions of the computers in Internet 4 which are connected by means of the inventive ISMTP protocol, are designated as follows: computer 3 is designated as ISMT client, computer 8 as ISMT transfer agent, and computer 9 as ISMT gateway. Computer 9, i.e. ISMT gateway, assumes the function of a so-called External Short Message Entity ESME which is connected to the Short Message Service Center SMSC via a direct line. With the help of the inventive ISMTP protocol, short messages are transmitted via the Internet 4 between computer 3 (ISMT Clients), computer 8 (ISMT Transfer Agents) and computer 9 (ISMT Gateways). At the borderline of the Internet 4, the short messages from computer 9 (ISMT Gateway) are converted into the specific data formats or protocols which are required for the communication with a Short Message Service Center SMSC of a specific provider. Subsequently, the short messages SMS are transmitted by means of one of the conventional protocols SMPP, UCP or CIMD to the Short Message Service Center SMSC.

The inventive ISMTP protocol differs in two essential points from existing protocols for the transmission of short messages between so-called External Short Message Entities ESME and Short Message Service Centers SMSC. Firstly, the protocol is not only machine-readable, but can also be read by a human being or manually used as a command language. Secondly, the protocol allows for messages to be sent to computers 8 (ISMT Transfer Agents) which accept the short message and will further process it before it is forwarded to a further computer 8 (ISMT Transfer Agent) or delivered to a Short Message Service Center SMSC. In contrast, existing protocols are only designed for the transmission of short messages from an External Short Message Entity ESME to a Short Message Service Center SMSC. This is made possible by the character strings exchanged according to the invention between the computers 3, 8, 9 in Internet 4, before, during or after the transmission of the short message SMS between computers 3, 8, 9 in Internet 4.

In the following, an example is given in which a computer R1 sends a short message by means of the inventive protocol ISMTP to a computer R2. The above-mentioned computers R1 and R2 may be one of the above-described computers 3 (ISMT Client), 8 (ISMT Transfer Agent) or 9 (ISMT Gateway). The computer R1 opens a session-oriented connection via a data network which allows for session-oriented connections. Typically, computer R1 will open a TCP/IP connection via an IP-based network to a so-called dedicated port on computer R2. Next, computer R1 authorizes at computer R2 by the computer R1 sending the character sequence .LOGIN together with a user identification and a password to computer R2. Computer R2 will also answer with a character string containing a status code and a status description indicating whether or not the log-in has been successful. Subsequently, computer R1 will select a so-called output channel to which then a short message SMS is to be transmitted. For this purpose, computer R1 will send a character string .SELECT-CHANNEL in combination with the name of an output channel to computer R2. Computer R2 again will answer with a character string which contains a status code and a status report indicating whether or not the selection of the output channel has been successful. Finally, computer R1 will transmit a short message to the selected output channel at R2, by R1 transmitting to computer R2 the character string START-TRANSFER, followed by a short message in the data format described and the character string .END-TRANSFER. Computer R2 again will answer with a character string which contains a status code and a status report indicating whether or not the message could be successfully transmitted. Furthermore, computer R1 may at any time send the character string .QUIT to computer R2 so as to terminate the on-going session with computer R2. Also in that case computer R2 will answer with a character string that contains a status code and a status report indicating whether or not the operation has been successful.

In the following, such an example of a short message in text format which is sent to the recipient address 436766688600 is illustrated:

LOGIN USER= . . . PASSWORD= xxxx

SELECT-CHANNEL channel= "t-mobile"

START-MESSAGE

MIME version: 1.0

Message-ID: T-Mobil-SMS-345672

MIME-Type: x-ismt/x-text-message

Sender address: 82668

Recipient address: 436766688600

Hi! This is a normal text SMS. Here are the useful data.

END-MESSAGE

QUIT

Figure 4:
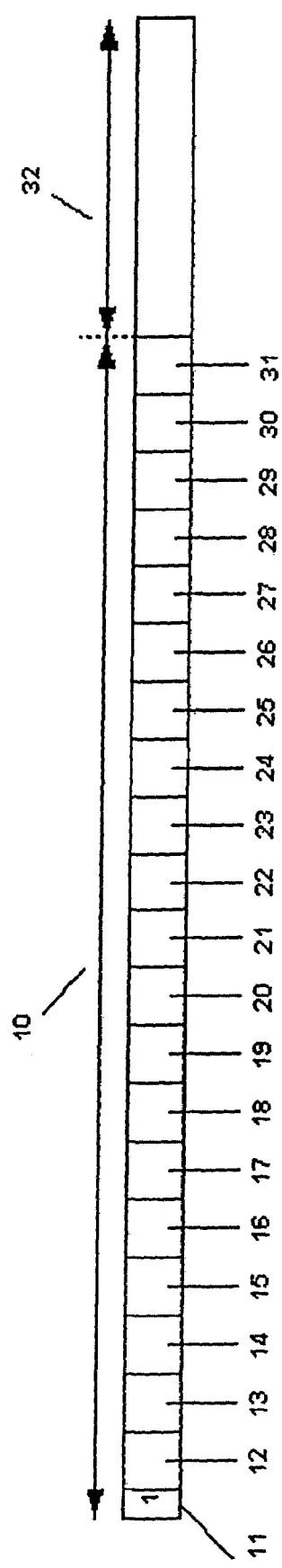
FIG. 4 schematically shows an example of a data format.

By way of schematic FIG. 4, an example of a data format consisting of a header part 10 and a useful part 32, with a series of data fields 11–31 in header part 10 is illustrated, which will be explained in more detail hereinafter:

MIME (Multipurpose Internet Mail Extension) version: This data field 11 indicates the MIME version of the short message; for the time being, this field 11 is fixed at the value 1. In future changes, this can be entered in the respective data field 11 of the data format.

MIME (Multipurpose Internet Mail Extension) type: This data field 12 indicates the type of the transported contents (media objects) of the short message, i.e. whether it is a textual, segmented or binary short message.

Message identification (message Id): This data field 13 may contain a unique identification which is defined by the sender of the short message. The value of this data field 13 preferably will be provided in encoded form.

Sender Ton: This data field 14 indicates the type of network of the sender address, and according to the GSM specification 03.40, 9.1.2.5 it will consist of a value between 0 and 7.

Sender Npi: This data field 15 contains the network numbering plan of the sender address and exhibits a value of 0, 1, 3, 4, 8, 9 or 10 according to GSM specification 03.40,9.1.2.5

Sender address: This data field 16 contains the address of the sender in a format corresponding to the data field 14 for the entry sender Ton and the data field 15 for the sender Npi.

Recipient Ton: In accordance with the above-described data field 14 sender Ton, this data field 17 contains the entry for the recipient address.

Recipient Npi: This data field 18 contains the network numbering plan for the recipient address, such as the data field 15 for the sender Npi.

Recipient address: This data field 19 contains the address of the recipient in a format corresponding to the data field 17 recipient Ton and the data field 18 recipient Npi.

Protocol identification (protocol Id): This data field 20 contains an identification for the contents transported by the SMS and may have a value of between 0 and 255 according to GSM specification 03.40,9.2.3.9.

Compression (Is-compressed): This data field 21 indicates whether or not the useful data in the short message are compressed and preferably has a value of 0 or 1.

MESSAGE class: This data field 22 contains an information on the class of the short message according to GSM standard 03.38, p. 6.

Alphabet: This data field 23 contains data regarding the encoding of the useful data of the short message SMS.

Priority: This data field 24 contains an optional indication of the priority of the short message sent and may, e.g., have the values between 0 and 9.

Validity period: This data field 25 may contain a date and/or a time at which the short message should expire and should accordingly be deleted.

Confirmation (Cod): This data field 26 may contain an entry whether or not a confirmation is requested after the short message SMS has successfully been delivered to the terminal. Preferably, this data field 26 contains the value 0 or 1.

Replace if present: This data field 27 indicates whether or not a previously delivered short message is to be replaced by the new short message and it may again have a value of 0 or 1.

Repetition (reply path): This data field 28 contains an information on whether or not the short message is to be repeated.

Send on: This data field 29 contains an information regarding the date and, optionally, the time at which the short message is to be forwarded.

Created on: This data field 30 contains an information regarding the date and, optionally, the time at which the short message has been created.

Sender IP address list: Optionally, in the data format present, the unique Internet address (IP address) of the sender of the short message may be entered in a data field 31. In this manner, all Internet addresses (IP number addresses) of the computers involved in the transmission can be indicated. By this, security checks can be performed upon the receipt and the transmission of short messages.

Useful part 32: Here, the useful message proper will follow after the above-indicated data, which useful message may be present either in textual form or in binary form. A hexadecimal conversion of the useful signal information may be provided.

In the simplest case, a data set of a short message according to the present invention contains the indication regarding the MIME version, an indication regarding the address of the sender, an indication regarding the address of the recipient, and finally, the short message in textual or hexadecimal form and an appropriate end signal.

By the technique according to the invention, an efficient and cost-effective transmission of short messages via computer networks, such as the Internet, is made possible outside of mobile phone networks. Here, the invention resides in a special method or in a special transmission protocol, and thus also in a special short message format.

The invention claimed is:

1. A method for transmitting a short message between computers in the Internet, wherein the short message is converted into a data format comprised of a header part and a useful part, with at least one data field for determining a data format, at least one data field for identifying a sender, and at least one data field for identifying a recipient being inserted into the header part, comprising before the transmission of the short message, exchanging character strings (.LOGIN, .SELECT-CHANNEL) between computers, wherein prior to the transmission of the short message at least one first character string (.SELECT-CHANNEL) for selecting a channel and at least one second character string (.LOGIN) which contains a user identification for authenticating the sender of the short message are exchanged between computers, and further transmitting a third character string (.QUIT) from the sender of the short message which contains a quitting order to terminate the transmission of the short message.

2. The method according to claim 1, wherein a Multipurpose Internet Mail Extension (MIME) version is entered in the data field for determining the data format.

3. The method according to claim 2, wherein a MIME data field for defining the type of short message is inserted in the header part.

4. The method according to claim 1, wherein a Message Id data field is inserted in the header part to indicate a unique identification for the short message.

5. The method according to claim 1, wherein a Sender Ton data field is inserted in the header part to indicate, the type of network of the sender of the short message.

6. The method according to claim 1, wherein a Sender Npi data field is inserted in the header part to determine the numbering plan of the network of the sender.

7. The method according to claim 1, wherein a Recipient Ton data field is inserted in the header part to determine the type of network of the recipient.

8. The method according to claim 1, wherein a Recipient Npi data field is inserted in the header part to define the numbering plan of the network of the recipient.

9. The method according to claim 1, wherein a Protocol Id data field is inserted in the header part to identify the contents transported with the short message.

10. The method according to claim 1, wherein an Is-Compressed data field is inserted in the header part to indicate a compression of the useful data.

11. The method of claim 1, wherein a Message Class data field is inserted in the header part to distinguish the class of the short message.

12. The method of claim 1, wherein an Alphabet data field is inserted in the header part to determine the code of the useful data.

13. The method of claim 1, wherein a Priority data field is inserted in the header part to determine the priority of the short message.

14. The method of claim 1, wherein a Validity-Period data field is inserted in the header part to input the expiration date of the short message.

15. The method according to claim 1, wherein a Cod data field is inserted in the header part to determine whether or not a confirmation of the receipt of the short message is required.

16. The method according to claim 1, wherein a Replace-If-Present data field is inserted in the header part to determine whether or not a previously created short message is to be replaced by the new short message.

17. The method according to claim 1, wherein a Reply Path data field is inserted in the header part to determine the number of repetitions of the sending attempts for the short message.

18. The method according to claim 1, wherein a Send-On data field is inserted in the header part to determine a desired point of time of sending the short message.

19. The method according to claim 1, wherein a Created-On data field is inserted in the header part to enter the point of time of creating the short message.

20. The method according to claim 1, wherein a Sender-Ip-Address data field is inserted in the header part to transmit Internet addresses of the computers involved in the transmission.

21. The method according to claim 1, wherein the recipient of the short message upon transmission of the second character string (.LOGIN) for authenticating the sender of the short message transmits a character string to the sender which contains at least a status code regarding the success of the authentication.

22. The method according to claim 1, wherein after a successful log-in, the first character string (.SELECT-CHANNEL) is transmitted from the sender to the recipient of the short message which contains data regarding selection of an output channel of the receiving computer.

23. The method according to claim 22, wherein the recipient answers the sender of the short message with a character string which contains data on the success of the selection of the output channel.

24. The method according to claim 23, wherein a character string is transmitted to the sender of the short message as a response of the recipient of the short message which contains data regarding the success of the quitting order.

* * * * *